United States Patent
Shim et al.

(10) Patent No.: US 7,541,013 B2
(45) Date of Patent: Jun. 2, 2009

(54) METHOD FOR MANUFACTURING TRANSITION METAL BORIDE POWER

(75) Inventors: Jae-Hyeok Shim, Seoul (KR); Ji-Woo Kim, Suwon-shi (KR); Young-Whan Cho, Seoul (KR)

(73) Assignee: Korea Institute of Science and Technology, Hawolgok-dong, Seongbuk-gu, Seoul (KR)

( * ) Notice: Subject to any disclaimer, the term of this patent is extended or adjusted under 35 U.S.C. 154(b) by 0 days.

(21) Appl. No.: 12/052,877

(22) Filed: Mar. 21, 2008

(65) Prior Publication Data

US 2008/0233032 A1  Sep. 25, 2008

(51) Int. Cl.
*C01B 35/04* (2006.01)
*C01B 25/08* (2006.01)
*C01B 6/10* (2006.01)

(52) U.S. Cl. .................. 423/297; 423/289; 423/295
(58) Field of Classification Search .......... 423/289, 423/295, 297
See application file for complete search history.

(56) References Cited

U.S. PATENT DOCUMENTS 3,244,482 A * 4/1966 Culbertson et al. .......... 423/297
4,888,166 A * 12/1989 Logan ......................... 423/297
2006/0194695 A1 * 8/2006 Au .............................. 502/400

FOREIGN PATENT DOCUMENTS

SU  1096901  A  *  9/1985

OTHER PUBLICATIONS

Kudaka et al. Mechanochemical syntheses of Titanium Carbide, diboride and Nitride; Journal of the Ceramic Society of Japan; 107, 11 pp. 109-1024; 1999.*
Shi et al.; A Convenient Solid-State Reaction Route to Nanocrystalline TiB2; InorganicChemistry Communications; 7, pp. 192-194; 2004.*
Derwent Abstract of SU 1096901 A.*
Sasaki et al. Synthesis of Titanium Carbide an Titanium Diboride by Mechanochemical Displacement Reaction; Journal of Materials Science Letters; 20, pp. 1619-1622; 2001.*

\* cited by examiner

*Primary Examiner*—Melvin C Mayes
*Assistant Examiner*—Guinever S Gregorio
(74) *Attorney, Agent, or Firm*—Lexyourne IP Group, LLC; Johnwon Kim

(57) ABSTRACT

The present invention relates to a method for manufacturing a transition metal boride powder. The method for manufacturing a transition metal boride powder includes: i) manufacturing a mixed powder by mixing a transition metal halogenide powder and an alkali metal borohydride powder; ii) charging the mixed powder and a plurality of balls into a reaction vessel; iii) charging an inert gas into the reaction vessel and sealing the reaction vessel; iv) high energy ball milling the mixed powder and manufacturing a composite powder containing a transition metal boride and an alkali metal halogenide; v) washing the composite powder in water, dissolving the alkali metal halogenide in the water and filtering the transition metal borides; and vi) drying the filtered transition metal boride and collecting the transition metal boride powder.

10 Claims, 4 Drawing Sheets

METHOD FOR MANUFACTURING TRANSITION METAL BORIDE POWER

CROSS-REFERENCE TO RELATED APPLICATION

This application claims priority to and the benefit of Korean Patent Application No. 10-2007-0028616 filed in the Korean Intellectual Property Office on Mar. 23, 2007, the entire contents of which are incorporated herein by reference.

BACKGROUND (a) Field of the Invention

The present invention relates to a simple method for manufacturing transition metal boride powder with a low cost.

(b) Description of the Related Art

Transition metal boride not only has good wear-resistance and high temperature oxidation resistance, but also has high strength and elasticity at high temperature. Therefore, transition metal boride has been used for cutting tools, as a bullet-proof material, a wear-resistant material, a heat resistant coating material, and so on. Hardness and toughness of a part in which the transition metal boride is used are largely increased as the particle size of the transition metal boride become smaller.

As a method for generating a general transition metal boride powder, it is known that the transition metal boride powder is obtained by reacting a composite containing transition metals and composites containing boride at a high temperature over a number of hours. However, expensive equipments are needed for driving and maintaining the high temperature reaction in the above method. In addition, the reaction progresses at a high temperature, and thereby particles of the reaction products tend to easily grow. Therefore, it is difficult to obtain ultrafine particles. Accordingly, it is difficult to manufacture a transition metal boride powder with ultrafine particle size.

SUMMARY

A simple method for manufacturing transition metal boride powder with a low cost is provided.

A method for manufacturing transition metal boride powder according to an embodiment of the present invention includes: i) manufacturing a mixed powder by mixing a transition metal halogenide powder and an alkali metal borohydride powder; ii) charging the mixed powders and a plurality of balls into a reaction vessel; iii) charging an inert gas into the reaction vessel and sealing the reaction vessel; iv) high energy ball milling the mixed powders and manufacturing a composite powder containing a transition metal boride and an alkali metal halogenide; v) washing the composite powder in water, dissolving the alkali metal halogenide in water, and filtering the transition metal boride; and vi) drying the filtered transition metal boride and collecting the transition metal boride powder.

The particle size of the transition metal boride powder may be not more than 100 nm in the collecting of the transition metal boride powder. The mole ratio of the alkali metal borohydride powder to the transition metal halogenide powder may be in a range from about 0.3 to about 3 in the manufacturing of the mixed powder. The mole ratio may be substantially about 2.

An alkali metal hydride powder may be further added to the mixed powder in the manufacturing of the mixed powders. A transition metal contained in the transition metal halogenide powder may be at least one metal selected from a group of titanium (Ti), niobium (Nb), vanadium (V), zirconium (Zr), scandium (Sc), yttrium (Y), chromium (Cr), molybdenum (Mo), manganese (Mn), nickel (Ni), cobalt (Co), iron (Fe), tantalum (Ta), and tungsten (W) in the manufacturing of the mixed powders. The transition metal boride powder may be at least one powder selected from a group consisting of titanium boride ($TiB_2$) powder, niobium boride ($NbB_2$) powder, and vanadium boride ($VB_2$) powder in the collecting transition metal boride powders.

An alkali metal contained in the alkali metal borohydride powder may be lithium or sodium in the manufacturing of the mixed powder. The halogenide contained in the transition metal halogenide powder may be chloride or fluoride in the manufacturing of the mixed powder. The mixed powder may be high energy ball milled for about 1 to 10 hours in the manufacturing of the composite powder.

DETAILED DESCRIPTION OF THE EMBODIMENTS

Exemplary embodiments of the present invention will be explained in detail below with reference to the attached drawings in order for those skilled in the art of the present invention to easily perform the present invention. However, the present invention can be realized in various forms and is not limited to the embodiments explained below. Wherever possible, the same reference numbers will be used throughout the drawings to refer to the same or like parts.

All terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
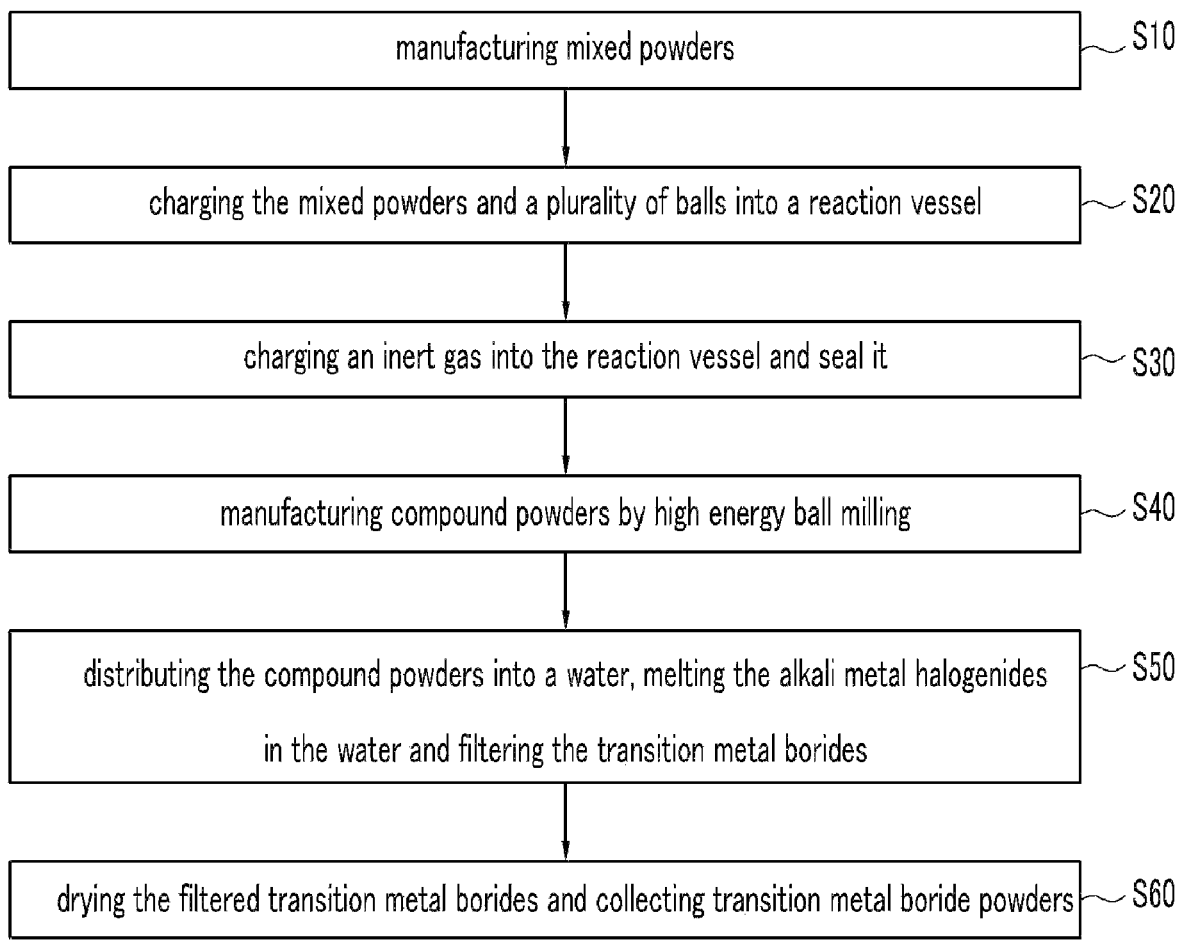
FIG. 1 is a flow diagram illustrating a method for manufacturing a transition metal boride powder according to an embodiment of the present invention.

FIG. 1 schematically shows a method for manufacturing a transition metal boride powder according to an embodiment of the present invention in order.

As illustrated in FIG. 1, a method for manufacturing a transition metal boride powder includes a step of manufacturing a mixed powder (S10); a step of charging the mixed powder and a plurality of balls into a reaction vessel (S20); a step of charging an inert gas into the reaction vessel and sealing it (S30); a step of manufacturing a composite powder by high energy ball milling (S40); a step of washing the composite powder in water and dissolving the alkali metal halogenide in the water and filtering the transition metal boride (S50); and a step of drying the filtered transition metal boride and collecting the transition metal boride powder (S60). Each of the steps will be explained as follows.

Firstly, the mixed powder is manufactured in the step S10. The mixed powder can be manufactured by mixing a transition metal halogenide powder, an alkali metal borohydride powder, and an alkali metal hydride powder. In addition, other powders can be further added.

The transition metal halogenide powder, alkali metal borohydride powder, and alkali metal hydride powder can be mixed together in a mole ratio of x:y:z. The alkali metal hydride powder may not be added in a certain case. That is, when the transition metal boride powder is manufactured, the alkali metal hydride powder is not necessarily added if halogen elements, which are residually formed, do not exist.

In the above mole ratio, x and y can be integers of not less than 1. The x and y are determined by a stoichiometric ratio of the transition metal boride to be manufactured. Here, the ratio of y to x may be in a range from about 0.3 to about 3. If the ratio of y to x is too small, that is, if the mole number of the alkali metal borohydride is significantly greater than that of the transition metal halogenide, it is difficult to manufacture a transition metal boride. On the contrary, if the ratio of x to y is too small, that is, if the mole number of the transition metal halogenide is significantly greater than that of the alkali metal borohydride, all of the transition metal is not reacted and residual amounts thereof exist.

In addition, in the above mole ratio, z is determined to be an amount that is necessary for manufacturing a halogen element that is residually formed in the alkali metal halogenide.

The transition metal halogenide is a composite of the transition metal and a halogen element. For example, the transition metal may be titanium (Ti), niobium (Nb), vanadium (V), zirconium (Zr), scandium (Sc), yttrium (Y), chromium (Cr), molybdenum (Mo), manganese (Mn), nickel (Ni), cobalt (Co), iron (Fe), tantalum (Ta), or tungsten (W). The halogen element may be a chloride or a fluoride. In addition, for example, the transition metal halogenide may be titanium chloride ($TiCl_3$), niobium chloride ($NbCl_5$), or vanadium chloride ($VCl_3$).

The alkali metal borohydride is a composite of an alkali metal, boron and hydrogen. For example, the alkali metal may be lithium or sodium, and the alkali metal borohydride may be lithium borohydride ($LiBH_4$).

The alkali metal hydride is a composite of the alkali metal and the hydrogen. For example, the alkali metal may be lithium and so on.

Next, in the step S20, the mixed powder and a plurality of balls are charged into a reaction vessel. The reaction vessel or the balls can be made of tool steel, stainless steel, a highly hardened alloy (WC—Co), silicon nitride ($Si_3N_4$), alumina, or zirconia. The diameter of the ball may be in a range from 5 mm to 30 mm and a weight ratio of the plurality of balls to the mixed powder is in a range from about 1 to about 30.

An inert gas is charged into the reaction vessel and the reaction vessel is sealed in the step S30. Argon, hydrogen, or nitrogen can be used as the inert gas. Since high energy ball milling is carried out in a following process, the inert gas is charged into the reaction vessel in order to prevent an explosion caused thereby.

The composite powder is manufactured by high energy ball milling the mixed powder in the step S40. A mechanochemical reaction is driven in the mixed powder by the high energy ball milling. Therefore, the transition metal halogenide powder and the alkali metal borohydride powder are reacted with each other, and thereby the composite powder containing transition metal borides and alkali metal halogenides is formed. The high energy ball milling can be carried out by using a shaker mill, a vibratory mill, a planetary mill, an attritor mill, and so on.

As described above, the weight ratio of the plurality of balls to the mixed powder is in a range from about 1 to about 30, and thereby high energy ball milling can be effectively carried out. If the above weight ratio is too small, chemical reaction of the mixed powder is not carried out well since the intensity of the high energy ball milling is low. On the contrary, if the weight ratio is too large, some materials of the ball or the reaction vessel can be added to the mixed powder as foreign materials.

The high energy ball milling can be carried out for about 1 to 10 hours. If the time of high energy ball milling is too short, the transition metal halogenide powder and the alkali metal borohydride powder do not react well with each other. On the contrary, if the time of high energy ball milling is too long, some materials of the ball or the reaction vessel can be added to the mixed powder as foreign materials and the alkali metal borohydride powder can be thermally decompsed since the temperature of the reaction vessel can increase.

After the high energy ball milling is completed, hydrogen in the reaction vessel is removed by opening the reaction vessel, and the composite powder formed by the above mechanochemical reactions is discharged outside.

Next, in the step S50, the composite powder is washed in water and the alkali metal halogenide of the composite powder is dissolved in water. The composite powder contains the transition metal boride and the alkali metal halogenide, and the alkali metal halogenide is dissolved in the water while the transition metal boride is not dissolved therein. Therefore, the composite powder is washed in the water and filtered, and only the transition metal boride can remain.

In the step S60, the transition metal boride powder can be collected by heating and drying it. The filtered transition metal boride powder is heated and dried in an oven at about 100° C. for about 2 to 3 hours or is dried in a vacuum chamber, and thereby the transition metal boride powder is obtained. Titanium boride ($TiB_2$) powder, niobium boride ($NbB_2$) powder, or vanadium boride ($VB_2$) powder can be obtained as the transition metal boride powder.

The obtained transition metal boride powder has a nano-scale size. The particle size of the transition metal boride powder may be not more than about 100 nm. If the particle size of the transition metal boride powder is too large, hardness and toughness of a component in which the transition metal boride powder is used are deteriorated. Therefore, the particle size of the transition metal boride powder is maintained within the above range.

The present invention will be explained in detail hereinafter with reference to exemplary examples. The exemplary examples are merely to illustrate the present invention and the present invention is not limited thereto.

Exemplary Example 1

3 g of a mixed powder was manufactured by mixing titanium chloride ($TiCl_3$) powder, lithium borohydride ($LiBH_4$) powder, and lithium hydride (LiH) powder together in a mole ratio of 1:2:1. The mixed powder was charged into a vessel with a volume of 125 ml made of tool steel. Nineteen balls of 9.5 mm diameter, made of a super-hardened alloy WC—Co, were charged into the vessel. The total weight of the balls was 90 g. After argon gas was charged into the vessel, composite powder was manufactured by carrying out high energy ball milling for 4 hours using a planetary mill. Next, the vessel was opened and gas formed in the vessel was removed. Then, the composite powder was washed in distilled water. After the composite powder was filtered by using filtering paper, it was heated and dried in an oven at 100° C. for 2 hours, and thereby the transition metal boride was collected.

Experimental Result of the Exemplary Example 1

Figure 2:
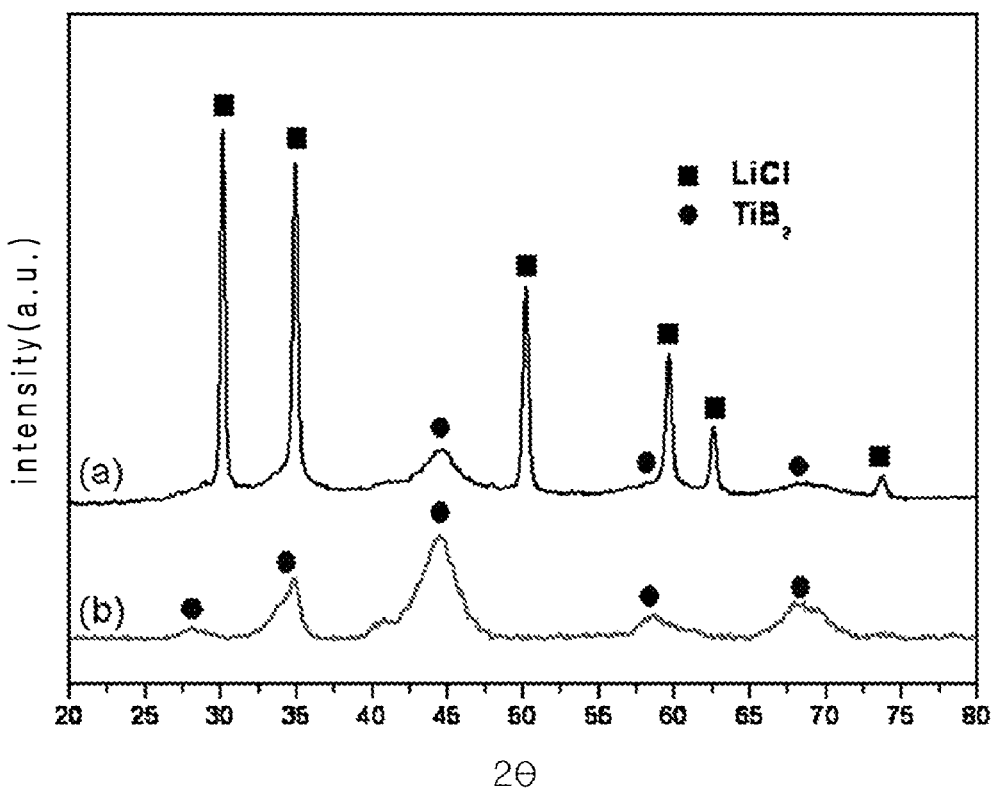
FIG. 2 is a graph in which (a) shows an X-ray diffraction pattern of the high energy ball milled composite powder according to a first exemplary embodiment of the present invention and (b) shows an X-ray diffraction pattern of the washed and filtered composite powder according to the first exemplary embodiment of the present invention.

FIG. 2 shows a graph in which (a) shows an X-ray diffraction pattern of the high energy ball milled composite powder, and (b) shows an X-ray diffraction pattern of the material that was washed in the distilled water and filtered, then heated and dried in an oven.

As illustrated in (a) of FIG. 2, as a result of analyzing the X-ray diffraction pattern of the composite powder, it was recognized that lithium chloride (LiCl) and titanium boride ($TiB_2$) existed. That is, a composite powder containing LiCl, $TiB_2$, and hydrogen was formed through a reaction of the Chemical Formula 1 below.

$$TiCl_3+2LiBH_4+LiH \rightarrow TiB_2+3LiCl+4.5H_2 \quad \text{[Chemical Formula 1]}$$

The hydrogen in the above Chemical Formula 1 was removed while collecting the composite powder. After the composite powder was washed in distilled water, it was filtered by using filtering paper. Next, the powder remaining in the filtering paper was loaded in the oven to be heated and dried. Then, the X-ray diffraction pattern of the heated and dried composite powder was analyzed. The result is shown in (b) of FIG. 2.

As illustrated in (b) of FIG. 2, it was recognized that only titanium boride ($TiB_2$) remained as a result of analyzing the X-ray diffraction pattern of the above material. That is, since the lithium chloride (LiCl) was easily dissolved in the distilled water, it was not filtered when filtering the water by the filtering paper. Nano-scaled filtered titanium boride powder could be obtained by loading the filtered titanium boride into the oven and heating it to dry.

Figure 3:
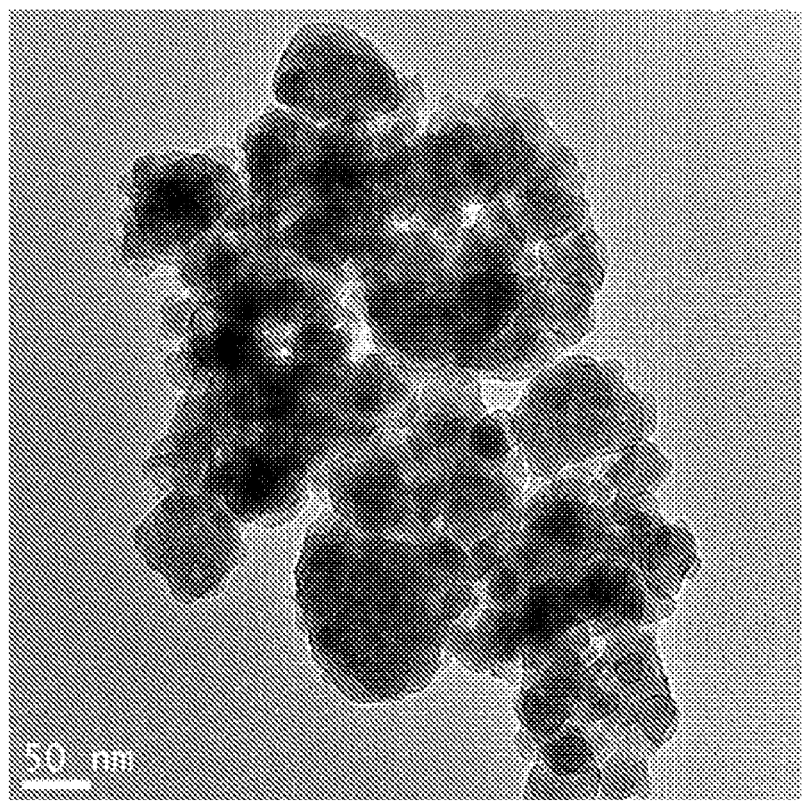
FIG. 3 is a transmission electron microscope micrograph of the transition metal boride powder manufactured according to the first exemplary embodiment of the present invention.

FIG. 3 illustrates a transmission electron micrograph of the titanium boride powder obtained by the above method.

As illustrated in FIG. 3, particles of the titanium boride powder generally had irregular shapes and the sizes, and most of the particles where very minute being not more than 100 nm. Therefore, nano-scaled titanium boride powder could be manufactured according to the Exemplary Example 1.

Exemplary Example 2

3 g of a composite powder was manufactured by mixing niobium chloride ($TiCl_5$) powder, lithium borohydride ($LiBH_4$) powder, and lithium hydride (LiH) together in a mole ratio of 1:2:3. The remaining experimental procedures were the same as those of the Exemplary Example 1.

Experimental Result of the Exemplary Example 2

Figure 4:
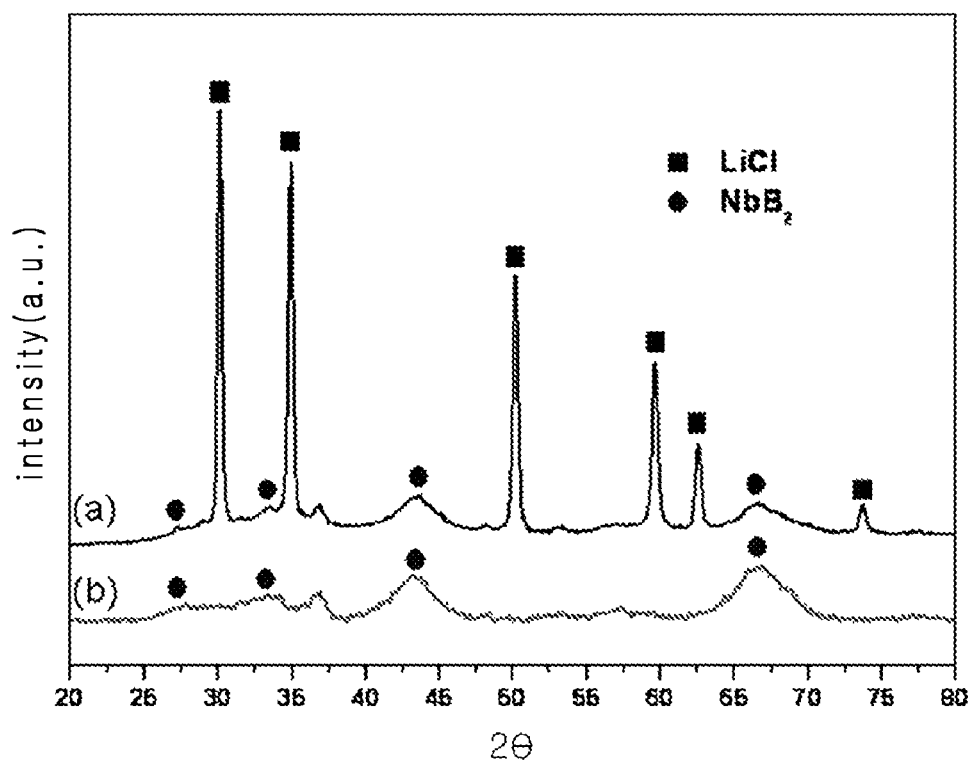
FIG. 4 is a graph in which (a) shows an X-ray diffraction pattern of the high energy ball milled composite powder according to a second exemplary embodiment of the present invention and (b) shows an X-ray diffraction pattern of the washed and filtered complex composites according to the second exemplary embodiment of the present invention.

FIG. 4 shows a graph in which (a) shows an X-ray diffraction pattern of the high energy ball milled composite powder, and (b) shows an X-ray diffraction pattern of the material that was distributed in the distilled water and filtered, then heated and dried in an oven.

As illustrated in (a) of FIG. 4, as a result of analyzing the X-ray diffraction pattern of the composite powder, it was recognized that lithium chloride (LiCl) and niobium boride ($NbB_2$) existed. That is, a composite powder containing LiCl, $NbB_2$, and hydrogen was formed through a reaction of the Chemical Formula 2 below.

$$NbCl_5+2LiBH_4+3LiH \rightarrow NbB_2+5LiCl+5.5H_2 \quad \text{[Chemical Formula 2]}$$

The hydrogen in the above Chemical Formula 2 was removed while collecting the composite powder. After the composite powder was washed in distilled water, it was filtered by using filtering paper. Next, the composite powder remaining in the filtering paper was loaded in the oven to be heated and dried. Then, the X-ray diffraction pattern of the heated and dried composite powder was analyzed. The result is shown in (b) of FIG. 4.

As illustrated in (b) of FIG. 4, it was recognized that only niobium boride ($NbB_2$) remained as a result of analyzing the X-ray diffraction pattern of the above material. That is, since the lithium chloride (LiCl) was easily dissolved in the distilled water, it was not filtered by the filtering water. Nano-scaled filtered niobium boride powder could be obtained by loading the filtered niobium boride into the oven and heating it to dry.

Figure 5:
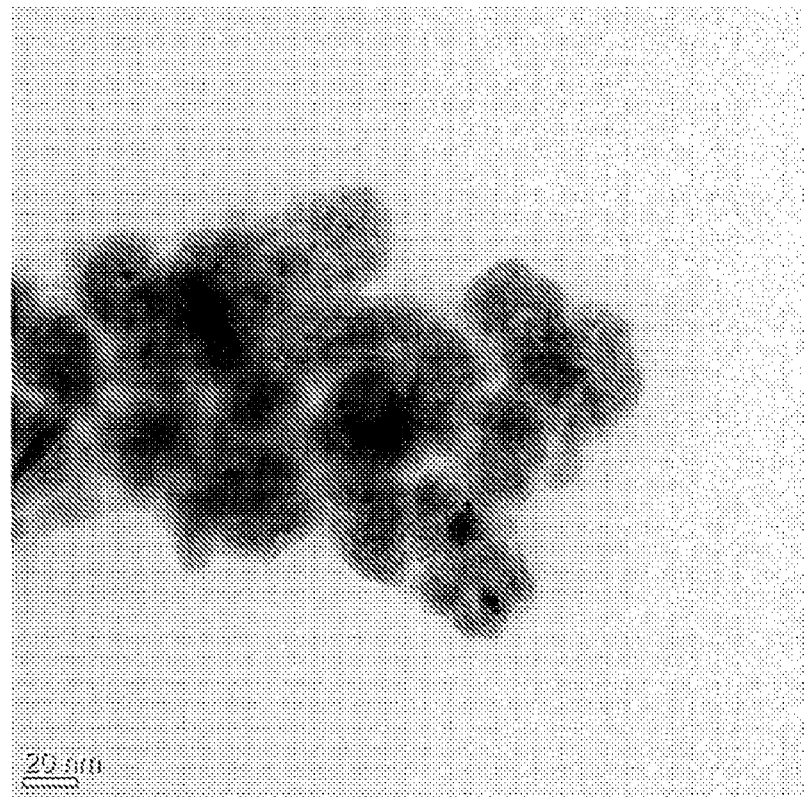
FIG. 5 is a transmission electron microscope micrograph of the transition metal boride powder manufactured according to the second exemplary embodiment of the present invention.

FIG. 5 illustrates a transmission electron micrograph of the niobium boride powder obtained by the above method.

As illustrated in FIG. 5, particles of the niobium boride powder generally had irregular shapes and sizes, of the most of the particles were very fine being not more than 100 nm. Therefore, nano-scaled niobium boride powder could be manufactured according to the Exemplary Example 2.

Exemplary Example 3

3 g of a composite powder was manufactured by mixing vanadium chloride ($VCl_3$) powder, lithium hydride ($LiBH_4$) powder, and lithium hydride (LiH) together in a mole ratio of 1:2:1. The remaining experimental procedures were the same as those of the Exemplary Example 1.

Experimental Result of the Exemplary Example 3

Figure 6:
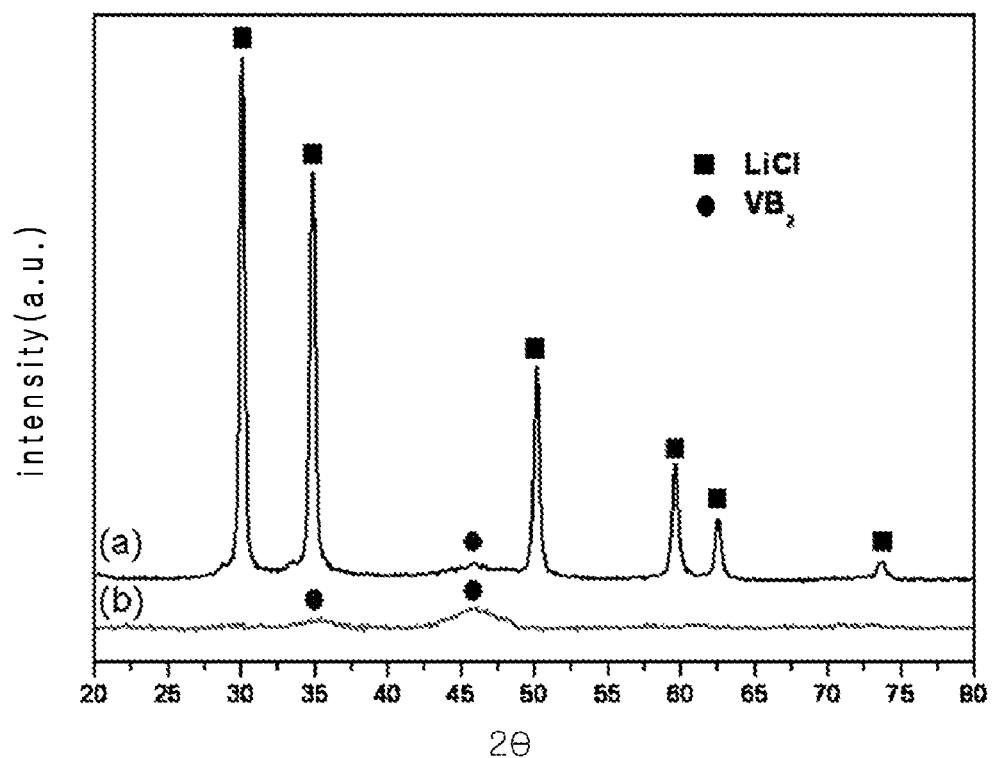
FIG. 6 is a graph in which (a) shows an X-ray diffraction pattern of the high energy ball milled composite powder according to a third exemplary embodiment of the present invention and (b) shows an X-ray diffraction pattern of the washed and filtered complex composites according to the third exemplary embodiment of the present invention.

FIG. 6 shows a graph in which (a) shows an X-ray diffraction pattern of the high energy ball milled composite powder, and (b) shows an X-ray diffraction pattern of the material that was washed in the distilled water and filtered, then heated and dried in an oven.

As illustrated in (a) of FIG. 6, as a result of analyzing the X-ray diffraction pattern of the composite powder, it was recognized that lithium chloride (LiCl) and vanadium boride ($VB_2$) existed. That is, a composite powder containing LiCl, $VB_2$, and hydrogen was formed through a reaction of the Chemical Formula 3 below.

$$VCl_3+2LiBH_4+LiH \rightarrow VB_2+3LiCl+4.5H_2 \quad \text{[Chemical Formula 3]}$$

The hydrogen in the above Chemical Formula 3 was removed while collecting the composite powder. After the composite powder was washed in distilled water, it was filtered by using filtering paper. Next, composite powder remaining in the filtering paper was loaded in the oven to be heated and dried. Then, the X-ray diffraction pattern of the heated and dried composite powder was analyzed. The result is shown in (b) of FIG. 6.

As illustrated in (b) of FIG. 6, it was recognized that only vanadium boride ($VB_2$) remained as a result of analyzing the X-ray diffraction pattern of the above materials. That is, since the lithium chlorides (LiCl) was easily dissolved in the distilled water, it was not filtered by the filtering water. Nano-scaled filtered vanadium boride powder could be obtained by loading the filtered vanadium boride into the oven and heating it to dry.

Figure 7:
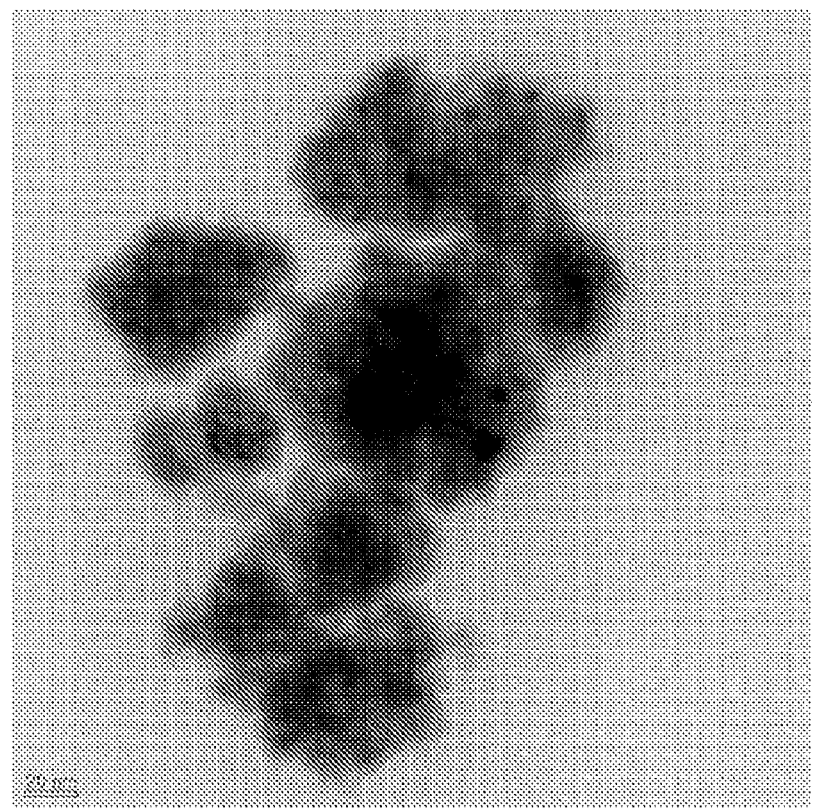
FIG. 7 is a transmission electron microscope micrograph of the transition metal boride powder manufactured according to the third exemplary embodiment of the present invention.

FIG. 7 illustrates a transmission electron micrograph of the vanadium boride powder obtained by the above method.

As illustrated in FIG. 7, particles of the vanadium boride powder generally had irregular shapes and sizes, and most of the particles were very fine being not more than 100 nm. Therefore, nano-scaled vanadium boride powder could be manufactured according to the Exemplary Example 3.

As described above, nano-scaled transition metal boride powder could be manufactured by using a simple method with a low cost. Since the nano-scaled transition metal boride powder has a large surface area, it may have a good reactivity. Therefore, it can be used as a catalyst.

While the present invention has been particularly shown and described with reference to exemplary embodiments thereof, it will be understood by those skilled in the art that various changes in form and detail may be made therein without departing from the spirit and scope of the invention as defined by the appended claims.

What is claimed is:

1. A method for manufacturing transition metal boride powder, the method comprising:

manufacturing a mixed powder by mixing a transition metal halogenide powder and an alkali metal borohydride powder;

charging the mixed powder and a plurality of balls into a reaction vessel;

charging an inert gas into the reaction vessel and sealing the reaction vessel;

high energy ball milling the mixed powder and manufacturing a composite powder containing a transition metal boride and an alkali metal halogenide;

washing the composite powder in water, dissolving the alkali metal halogenide in the water, and filtering the transition metal boride; and drying the filtered transition metal boride and collecting the transition metal boride powder.

2. The method of claim 1, wherein a particle size of the transition metal boride powder is not more than 100 nm in the collecting of the transition metal boride powder.

3. The method of claim 1, wherein a mole ratio of the alkali metal borohydride powder to the transition metal halogenide powder is in a range from about 0.3 to about 3 in the manufacturing of the mixed powder.

4. The method of claim 3, wherein the mole ratio is substantially about 2.

5. The method of claim 1, wherein an alkali metal hydride powder is further added to the mixed powder in the manufacturing of the mixed powder.

6. The method of claim 1, wherein a transition metal contained in the transition metal halogenide powder is at least one metal selected from the group consisting of titanium (Ti), niobium (Nb), vanadium (V), zirconium (Zr), scandium (Sc), yttrium (Y), chromium (Cr), molybdenum (Mo), manganese (Mn), nickel (Ni), cobalt (Co), iron (Fe), tantalum (Ta), and tungsten (W) in the manufacturing of the mixed powder.

7. The method of claim 1, wherein the transition metal boride powder is at least one powder selected from the group consisting of titanium boride ($TiB_2$) powder, niobium boride ($NbB_2$) powder, and vanadium boride ($VB_2$) powder in the collecting of the transition metal boride powder.

8. The method of claim 1, wherein an alkali metal contained in the alkali metal borohydride powder is lithium or sodium in the manufacturing of the mixed powder.

9. The method of claim 1, wherein halogenide contained in the transition metal halogenide powder is chloride or fluoride in the manufacturing mixed powder.

10. The method of claim 1, wherein the mixed powder is high energy ball milled for about 1 to 10 hours in the manufacturing of the composite powder.

* * * * *